United States Patent [19]

Dewaele

[11] Patent Number: 5,651,042

[45] Date of Patent: Jul. 22, 1997

[54] METHOD OF RECOGNIZING ONE OR MORE IRRADIATION

[75] Inventor: Piet Dewaele, Berchem, Belgium

[73] Assignee: Agfa-Gevaert N.V., Mortsel, Belgium

[21] Appl. No.: 641,822

[22] Filed: May 2, 1996

[30] Foreign Application Priority Data

May 11, 1995 [EP] European Pat. Off. ............. 95201215

[51] Int. Cl.$^6$ ..................................................... G01N 23/04
[52] U.S. Cl. ............................................. 378/62; 382/132
[58] Field of Search .................... 364/413.13, 413.23; 378/62; 382/132

[56] References Cited

U.S. PATENT DOCUMENTS

| | | | |
|---|---|---|---|
| 4,891,757 | 1/1990 | Shroy, Jr. et al. | 364/413.13 |
| 5,081,580 | 1/1992 | Takeo | 364/413.13 |
| 5,268,967 | 12/1993 | Jang et al. | 382/6 |

*Primary Examiner*—David P. Porta
*Assistant Examiner*—David Vernon Bruce
*Attorney, Agent, or Firm*—Brumbaugh, Graves, Donohue & Raymond

[57] ABSTRACT

Radiologists may protect their subjects against unnecessary exposure to X-rays by use of X-ray opaque material. They may also use X-ray opaque material to permit multiple exposures on a single image. The resulting image contains relatively unexposed regions resulting from the shadow cast by the X-ray opaque material. This invention discloses a method for the automatic determination of the location of the boundary between multiple exposures and the boundary between signal and shadow regions within each exposure. Many hypotheses as to the location of such boundaries are generated and the final decision as to the correct hypothesis is contingent on the results of a rule-based reasoning network.

6 Claims, 14 Drawing Sheets

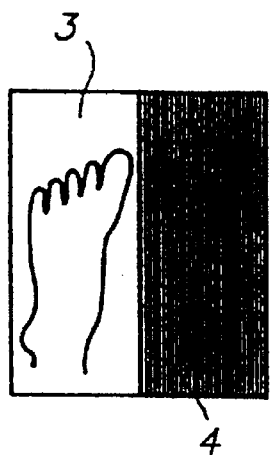 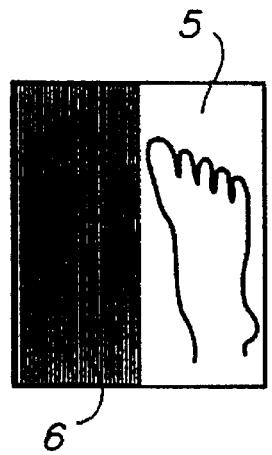 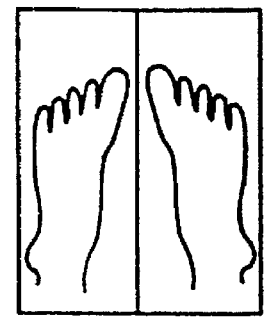
FIG. 2a      FIG. 2b      FIG. 2c
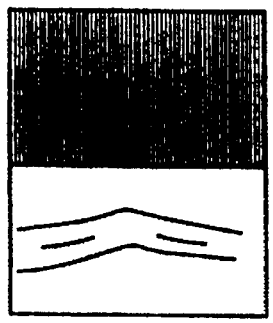 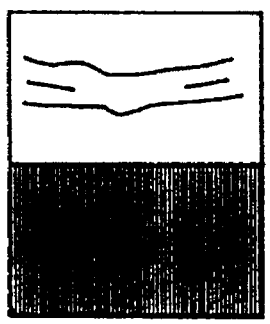 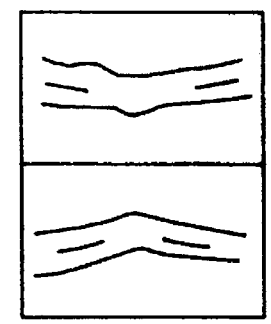
FIG. 2d      FIG. 2e      FIG. 2f

*original image*

*edge image* edges line primitives line-clusters multiple-exposure search-tree results line primitives line-clusters

*no masking (=single exposure)*

| | *ideal case* | *overlapping masks* | *incomplete masks* | *partly overlapping partly incomplete* |
|---|---|---|---|---|
| vertical split |  |  |  |  |
| horizontal split |  |  |  |  |

METHOD OF RECOGNIZING ONE OR MORE IRRADIATION

FIELD OF THE INVENTION

The present invention is in the field of digital radiography. The invention more specifically relates to a method of recognising one or more irradiation fields in a system wherein (a) radiation image(s) is (are) recorded on a photostimulable phosphor screen by means of an irradiation field stop (i.e. means for partially shielding the screen against irradiation).

DESCRIPTION OF PRIOR ART

Radiologists may protect their subjects against unnecessary exposure to X-rays by use of X-ray opaque material. The material is placed in the path of the X-ray beam so as to shield those areas of the patient which are not regarded as diagnostically important. The resulting image contains relatively unexposed regions which comprise the shadow cast by the X-ray opaque material.

In addition, radiologists may use similar X-ray opaque material to protect whole sections of the resulting image from exposure. By subsequent transposition of the opaque material, they can achieve multiple, but spatially non-overlapping, exposures of the same image. The motivation may be, for instance, to have two different views (hence sub-images) of the same subject juxtaposed on the same image.

In computer-assisted radiology, the X-ray image is digitised as a two dimensional array of numbers, whose magnitude is related to the intensity of X-rays arriving at the detector, via the patient. The values in the array may be rescaled, prior to display or printing, in order to maximise the visual contrast in the area of diagnostic interest. Such rescaling depends, in part, on the intensity histogram of the X-ray image, or if applicable, its sub-images. To achieve this function automatically, best results are obtained if, for each sub-image, the shadow cast by the collimation material is excluded from consideration, since it cannot contain any useful information, but would otherwise dominate the lower end of the intensity histogram.

The presence of the collimation shadow region can cause an additional problem in the display of the image on film. Therein, the shadow region is relatively bright, and if displayed unmodified, may impair diagnosis of subtle lesions due to dazzle, especially if the unexposed region is relatively large.

The following earlier work refers only to the situation where the whole X-ray image is subject to a single exposure (i.e. not multiply exposed).

In U.S. Pat. No. 4,952,807 by Adachi a method is disclosed for adjusting the image processing conditions by selecting only those pixels which correspond to the object or the background, i.e. the 'signal' region, under the assumption that the collimation material does not partly cover the object. i.e. the shadow region does not touch the object of the image, but rather its surrounding background. In many kinds of examinations however, parts of the patient will be shielded from exposure to avoid useless X-ray load, as is the case with lumbar spine and shoulder examinations.

U.S. Pat. No. 4,804,842 discloses a method for removing the lower part of the histogram corresponding to the pixels in the shadow region in order to adjust the image processing conditions.

However, techniques for histogram modification alone, do not address the second problem, i.e. that of dazzle. Its solution demands an explicit detection of the shadow region, as distinct from the signal region. The offending shadow region may then be excluded from the display process. In addition, the first problem of rescaling for optimum visual contrast can then proceed on the signal region alone, without the complicating influence of the shadow region on the intensity histogram.

Previous work in the field of automatically delineating the signal/shadow regions has relied on piecemeal attempts at the solution.

Many of the proposed methods are based on collecting candidate signal/shadow border pixels (i.e. edge pixels at the interface between signal and shadow regions) by thresholding on first differences along predetermined lines that might cross the signal/shadow border. A typical example of this approach is proposed by Funahashi in the U.S. Pat. No. 4,970,393. The signal region is recognised as a region enclosed by pixels where the first difference exceeds some specified threshold, either positive or negative.

A refinement of this technique is proposed in European patent 0 42 379, where multiple candidate pixels along a searching line are ranked, and only the highest rank candidates on each searching line are consisered in assembling the signal/shadow boundary. In both methodes the underlying assumption is that the signal/shadow boundary has strong contrast everywhere. In many cases however, contrast along parts of the signal/shadow boundary is nearly zero, especially if the collimation material is partially covering very dense parts of the body. So if the recognised signal/shadow boundary is assembled from high difference pixels many gaps will occur in general.

In European patent 0 285 174 a straightforward application of the basic Hough transform technique is proposed to delineate the signal/shadow boundary, which is assumed to be polygonal. The Hough transform is applied to prospective edge points obtained by differentiation. The unterlying assumptions are that the signal/shadow boundary is piecewise linear, and has high contrast with respect to the contrast of line features within the signal region. However, experimental evidence shows that edges within the signal region, e.g. bone edges, frequently have higher contrast than the signal/shadow boundary. As a consequence points in Hough transform space that correspond to straight bone boundaries may have higher scores than some of the actual signal/shadow borders, in which case the subsequent delineation procedure will fail.

A different approach is disclosed in the European patent 0 360 231. The image is subdivided into mutually adjacent non-overlapping tiles. A statistical parameter is computed indicating the edge content of the tile, either by differentiation in image space, or in frequency space. The tiles are accordingly classified as belonging to the relevant image region or not.

We ran elaborate experiments and concluded that single criteria based on edge contrast, or local statistical parameters at both sides of a prospective signal/shadow boundary, such as mean value, minimum, maximum, variance or spatial frequency coefficients are inadequate in delineating the irradiated field with a high level of confidence, say >98 percent. We found that the signal/shadow border contrast will vanish in some cases; anatomical structures may be straight and have high contrast edges: the image signal (which represents local dose) in the shadow region will occasionally be higher than the signal in the unshielded (i.e. diagnostic) image region—in cases where the scattered radiation is high and some parts of the body are difficult to penetrate by radiation. Also we found that there is no essential distinction between image areas corresponding to very poorly penetrated bone, and areas corresponding to shielded parts. Both kinds of areas will be characterised by an extremely low mean value (i.e. dose), similar noise level (both quantum limited), and by the absence of other features (since the signal to noise ratio is very low).

In order to obtain a high success rate, a preferred method should consider many hypotheses as to the location of the signal/shadow boundary (also called prospective signal/ shadow boundaries), and keep or reject each hypothesis "as a whole", instead of keeping or rejecting individual components of a hypothesis, such as edges.

Multiple hypotheses as to the location of the signal/ shadow boundary are considered in the method disclosed in U.S. Pat. No. 4,952,805. For each of the corresponding candidate signal regions, two signal histograms are computed: one for the pixels inside the candidate irradiation field and one for the pixels outside. The candidate boundary which is characterised by the largest degree of interclasses separation as determined from both histograms is selected to be the recognised irradiation field. The degree of interclass separation is defined in such a way that a high value will result if there is very little overlap between both histograms. Hence this criterion will be effective only if the range of signal values within irradiation field are well separated from the signal values of the shielded region, which does not hold in many practical cases as we verified on the basis of digital radiographs from various examinations. Also, there is a practical limitation regarding the feasibility of the above mentioned approach, in that the number of hypotheses as to the location of the irradiation field may be prohibitively large.

Previous work in general has focused on methods in which finding the boundary of an irradiation field essentially relies on a very small number of mostly local criteria. Reviewing a wide variety of examinations confirms that individual criteria will only work in a very limited number of cases. A high success rate can only be achieved if many sources of evidence are combined, ranging from local image features to global constraints.

According to European patent application EP-A-610.605, filed by Agfa-Gevaert N. V., many hypotheses as to the location of the boundary are generated and the final decision as to the correct hypothesis is contingent on the results of a number of high-level tests applied to each.

EP-A-610.605 discloses a method for the determination of the location of the signal/shadow boundary in an X-ray image represented in a digital signal representation that comprises the steps of:

i) Extracting low-level primitives from the X-ray image {X(i,j)}, ii) Forming a reduced number of intermediate-level primitives from the low-level primitives, iii) Building hypotheses as to the location of the signal-shadow boundary from combinations of intermediate-level primitives, during which each combination is subject to intermediate-level tests, whereupon partial or complete hypotheses are rejected or accepted, iv) Performing high-level verification tests on each hypothesis, whereupon hypotheses are rejected, or accepted at some cost, v) Selecting the hypothesis with the least cost.

The behaviour of the radiologist, in placing the collimation material around the patient, and in contriving to procure multiple exposures, may broadly be characterised by a set of simple rules. This invention addresses only the use of collimation material which casts a shadow whose outline is piece-wise linear. More specifically, for each individual exposure, the boundary between signal and shadow regions is assumed to be a rectangle of arbitrary location and orientation. It is assumed that the signal region is on the interior, and that any part of the rectangular boundary may, or may not, have a protection onto the (rectangular) detector, and therefore the image array; see FIG. 1a1f. In addition, it is assumed that the placement of X-ray opaque material (masks) to permit multiple exposure is always to divide the image into two, approximately equal, parts, either vertically or horizontally aligned; see FIG. 2a–2f. Note that the combination of multiple-exposure, and patient shielding (collimation) can give a wide variety of exposure area shapes; see FIG. 3a–3c.

OBJECTS OF THE INVENTION

It is an object of the present invention to provide a method of recognising multiple, independently acquired, irradiation fields in a single radiation image, in a system wherein a radiation image has been multiply exposed using irradiation field stops as masks.

It is a further object to provide a method for determination of the location of the multiple-exposure boundary of an X-ray image, wherein the X-ray image is represented by a digital signal representation and wherein the multiple-exposure boundary is the locus of the interface between the two or more sub-images resulting from the use of masks.

It is a still further object to provide such a method for application in a digital radiography system.

Still further objects will become apparent from the description hereafter.

STATEMENT OF THE INVENTION

To achieve the above objects the present invention provides a method of determining a multi-exposure boundary between sub-images in a multi-exposure X-ray image represented by a digital signal representation and of determining a signal/shadow boundary in each sub-image, comprising the steps of i) Extracting low-level line primitives from the X-ray image, ii) Forming intermediate-level primitives from the low-level primitives, iii) Building hypotheses as to the location of the multiple-exposure boundary from combinations of intermediate-level primitives, iv) Associating with each hypothesis a cost, v) Subjecting each hypothesis to evaluation tests via a rule-based partitioning reasoning network, vi) Selecting the hypothesis with the least cost, vii) Partitioning the image into sub-images according to the selected hypothesis, and viii) Submitting each sub-image for subsequent detection of the signal/shadow boundary to the following steps (ix) to (xv):

ix) Extracting low-level primitives from each sub-image, x) Forming intermediate-level primitives from the extracted low-level primitives, xi) Building hypotheses as to the location of the signal/ shadow boundary from combinations of intermediate-level primitives, xii) associating a cost with each hypothesis, xiii) Subjecting each hypothesis to evaluation tests via a rule-based collimation reasoning network, xiv) Selecting a hypothesis with the least cost, xv) Construction of a binary-valued mask image representing signal and shadow area to be used to extract the signal area in the X-ray image.

The invention includes two reasoning networks (rule-based systems) which, at each node, contain the rules for construction, costing, and evaluation of hypotheses of both multiple-exposure and signal-shadow boundaries. A different set of rules is used for detecting the partitioning boundary and for detecting the signal-shadow boundary in a sub-image. The first set of rules is called the partitioning rule network, the second is the collimation rule network.

These networks have the following properties:

a) Arrangement of the reasoning network so as to first classify hypotheses as topological, and subsequent as geometrical, archetypes.

b) Arrangement of network to subsequently further refine and evaluate hypotheses so classified.

c) Ability to train the network, by changing rule behaviour interactively, and monitor consequences of that change on the subsequent evaluation of the current hypothesis.

The main departures from the method disclosed in European patent application 610 605 are:

A) The simultaneous detection of multiple-exposure and (possibly more than one) signal/shadow boundaries in each X-ray image.

B) The use of reasoning networks embodying archetype classification, refinement, and evaluation of the hypotheses for the location of multiple-exposure and signal/shadow boundaries.

The method permits codification of expert-system type knowledge as to the geometry, topology, and statistics of the multiple-exposure and signal/shadow boundaries, and associated regions.

The invention is for example, applicable to a digital image signal obtained by exposing a photostimulable phosphor screen to an image originating from a partially shielded exposure of an object to X-rays, by scanning the screen with stimulating irradiation, detecting the light emitted upon stimulation and converting the detected light into a digital signal representation.

Commonly the digital signal is subjected to image processing such as contrast enhancement and signal-to-density mapping before being applied to an output device for reproduction or display. The result of the process of contrast-enhancement of an X-ray image is improved by permitting such to perform separate calculations on each of the diagnostically useful signal parts of each of the sub-images of the X-ray image. The results of the separate calculations may then be applied to each sub-image independently to present the signal part of the image with an optimal contrast, and also to reduce the brightness in shadow region so as to avoid dazzle during diagnosis.

In the statement of the invention and in the description hereinafter the term "X-ray image" is used in the meaning of a two-dimensional digital image representation as an array of numbers, the magnitudes of which are related to the intensity of the X-rays arriving at a 2-dimensional physical detector such as a photostimulable phosphor screen.

By "primitives" is meant features, such as lines (see FIG. 5a and 5b), and corners, intersection points etc. (see FIG. 6) which are extracted from the image as the result of low-level image processing.

An "intermediate-level primitive" is a combination of (basic) primitives which may be considered collectively when building a hypothesis. Intermediate-level primitives are generally fewer, and (spatially) larger than are (basic) primitives. Each primitive is constructed from a mutually exclusive set of pixels. Each intermediate-level primitive is constructed from a mutually exclusive set of (basic) primitives. As an example, a combination of lines (primitives) into line-clusters (intermediate level primitives) is illustrated in FIG. 7a–7c. Here, the line-cluster $L_c$ (FIG. 7c) is the result of two lines $1_3$ and $1_4$ (FIG. 7b), which have been grouped together into a single entity.

By the term "signal region" is meant the spatial area of an image which is not obscured by collimation material from a direct line-of-sight of the X-ray source, see FIG. 1b.

The "shadow region" is the area of the image which is obscured by the collimation material from a direct line-of-sight of the X-ray source; see also FIG. 1b.

The "multiple-exposure boundary" is the projection of the edge of the X-ray masking material on the image (see FIGS. 2a–2f). There may be cases where there is little or no contrast across that projection, as a result of collimation material in each of the sub-images, as in FIG. 3a and FIG. 3c. In that case, by "multiple-exposure boundary" is meant any straight line which splits the image into two sub-images, without crossing the signal region in either sub-image.

The "signal-shadow boundary" is the locus of the interface between the signal and the shadow regions. E.g. the pixels at the interface between the signal and the shadow regions.

Steps i) and ii) of the method of the invention achieve a reduced set of primitives which can be assembled into hypotheses as to the location of the multiple-exposure boundary. Similarly, for each sub-image, steps vi) and vii) of the method of the invention achieve a reduced set of primitives which can be assembled into hypotheses as to the location of the signal/shadow boundary.

In the context of collimation detection, a "hypothesis" is defined as a possible solution proposed by the method of the present invention for the segmentation (division into similar regions) of the original image into signal and shadow regions. e.g. a two-dimensional array of numbers isomorphic with the X-ray image, with pixel labels for signal and shadow regions.

Hypotheses are generated on the reduced (intermediate-level) set because, in general, the number of low-level primitives is too numerous to perform an exhaustive evaluation (steps iv and x) of every possible combination (steps iii and ix).

With reference to steps v) and xi) : following an exhaustive search (including evaluation) by the reasoning network of all topological combinations of intermediate-level primitives, the hypothesis with the least cost is the one adopted as the solution.

At step xii), by combining the solutions for the multiple-exposure boundary, (if applicable), and solutions for the signal/shadow boundaries (in each of the sub-images), a final result is constructed which is a mask image with (integer) labels at each pixel which is unique to (each of) the signal region(s), and a label at each pixel which is unique to the shadow region(s).

By "reasoning network" at point a) is meant a directed graph wherein each node corresponds to a binary-valued rule which acts upon the current hypothesis, and wherein each directed arc, from a parent to a child node say, is the flow of control for the current hypothesis from parent to child, provided the rule-value at the parent is true see FIG. 8.

There are two, effectively independent reasoning networks, each with its own entry point and terminal nodes. The two networks are for the evaluation of multiple-exposure hypotheses, and for the evaluation of collimation (signal/shadow) hypotheses.

By "archetype" at point a) is meant (a hypothesis belonging to) one of a set of generic—topological and geometrical—configurations, which may be subjected to an associated set of rules corresponding to a major branch in the reasoning network. As implied at point b) : within each of these major (archetypical) branches, the rules are designed to confirm, refine, and evaluate the archetypical classification, insisting on particular geometrical and statistical properties of the hypothesis known to be associated with that archetype—see FIG. 9.

BRIEF DESCRIPTION OF THE DRAWINGS

Particular aspects of the present invention as well as preferred embodiments thereof will be illustrated by means of the following drawings in which FIGS. 2a–2f show examples of multiple exposures.

DETAILED DESCRIPTION

Figure 1A:
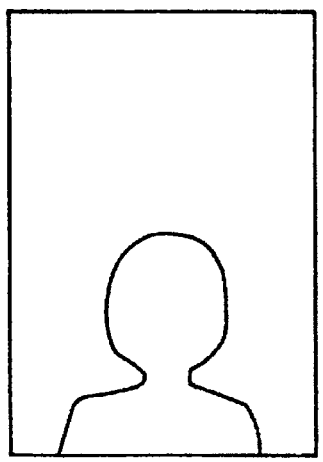
FIGS. 1a–1f show signal and shadow regions for typical single-exposure image.
Figure 1B:
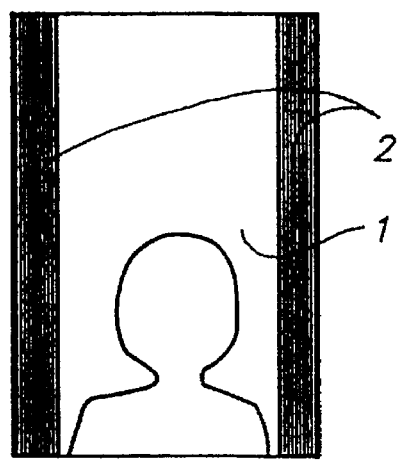
Figure 1C:
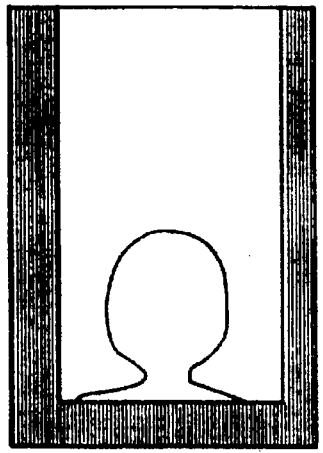
Figure 1D:
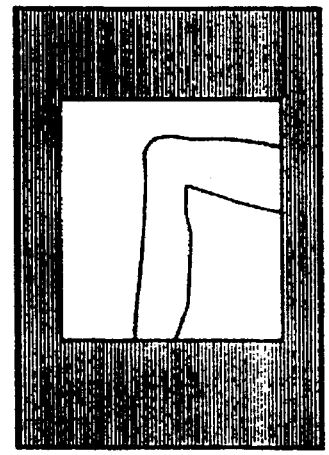
Figure 1E:
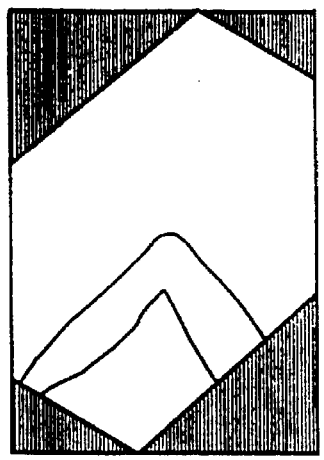
Figure 1F:
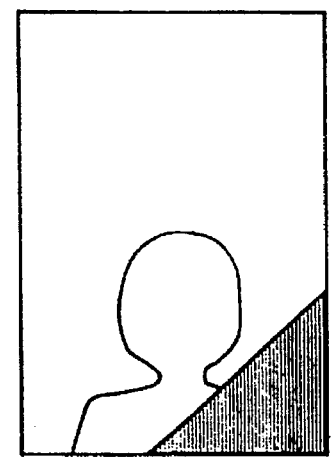
Figure 3A:
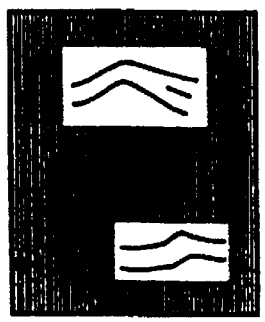
FIGS. 3a–3c show examples of multiple exposure and collimation combined.
Figure 3B:
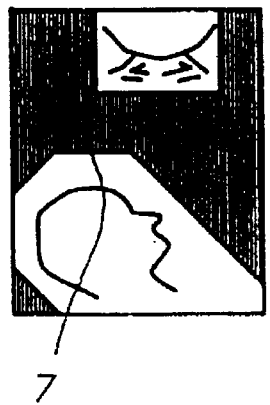
Figure 3C:
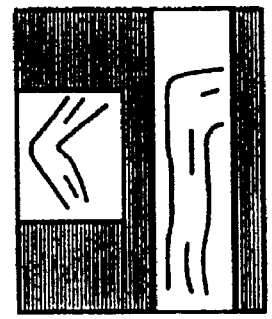
Figure 4A:
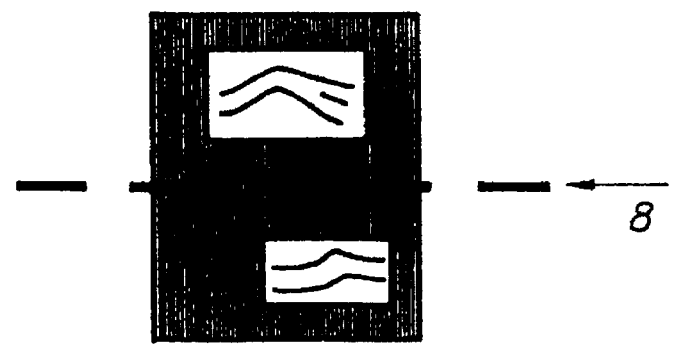
FIGS. 4a–4c show the placement of multiple-exposure boundaries.
Figure 4B:
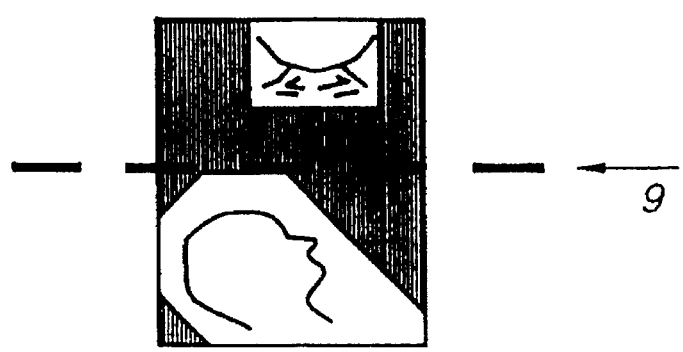
Figure 4C:
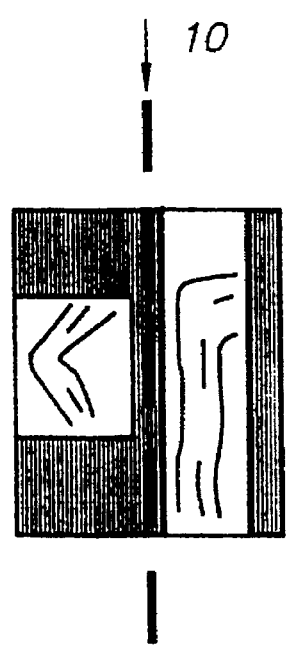
Figure 5A:
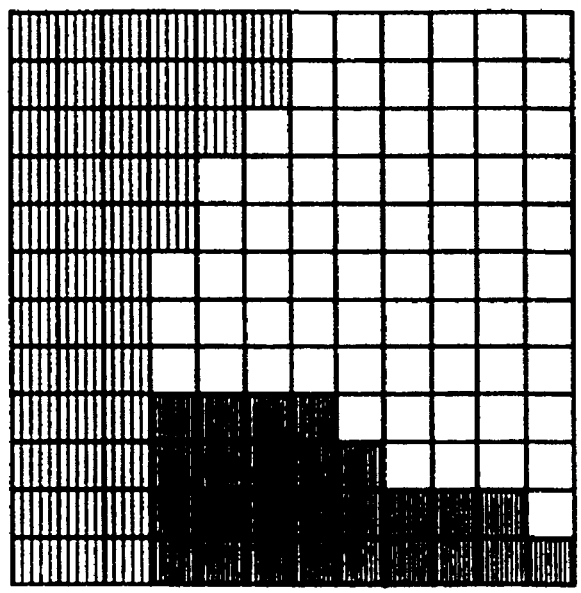
FIGS. 5a and 5b illustrate the definition of edges.
Figure 5B:
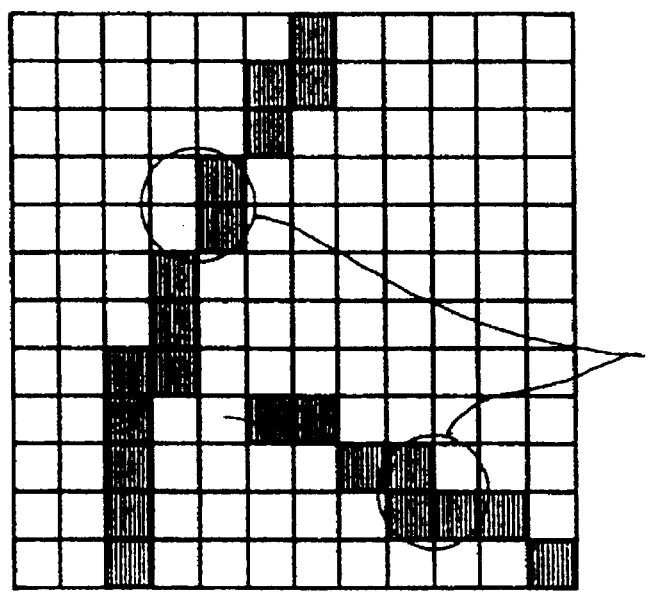
Figure 6:
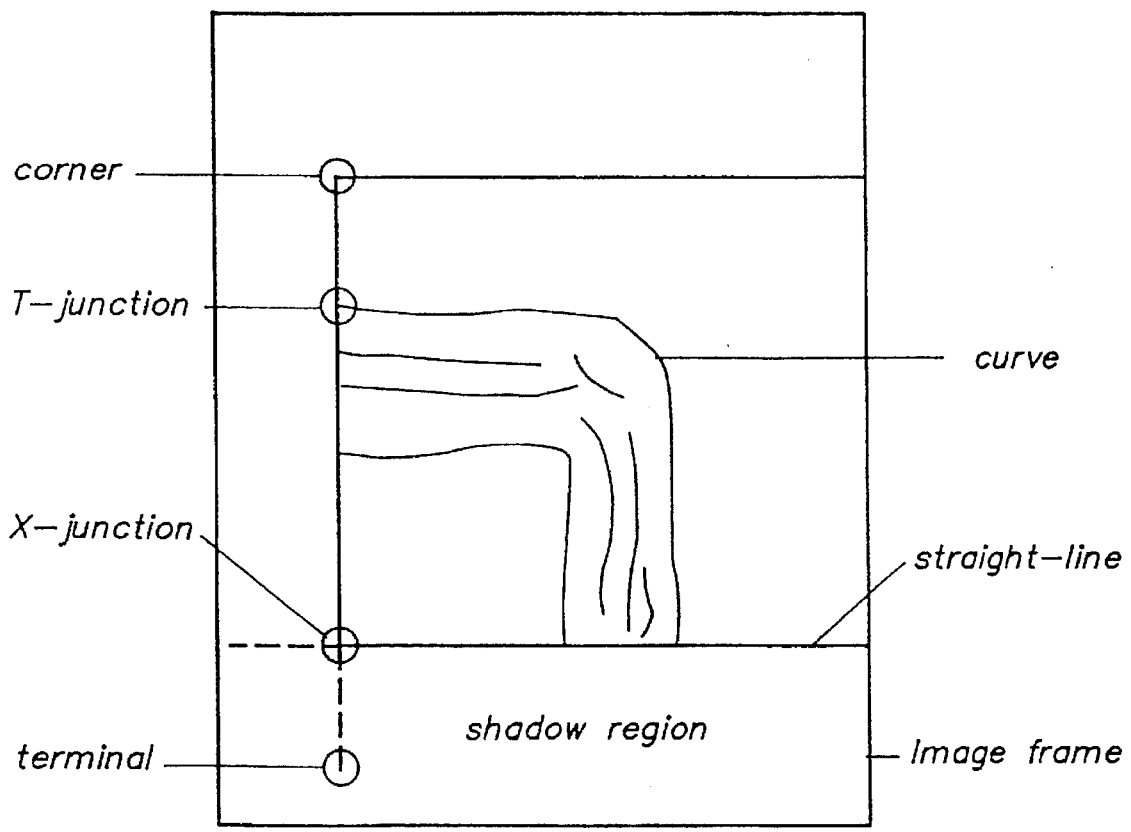
FIG. 6 shows low-level primitives.
Figure 7A:
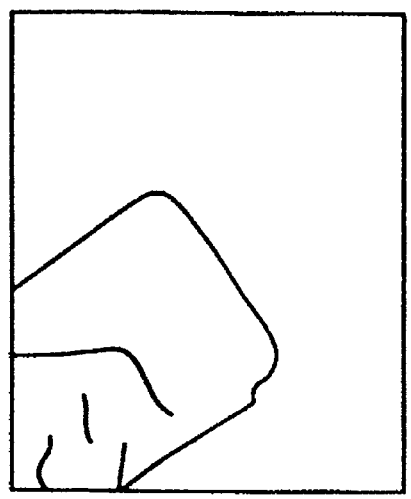
FIGS. 7a–7c illustrate line-clustering.
Figure 7B:
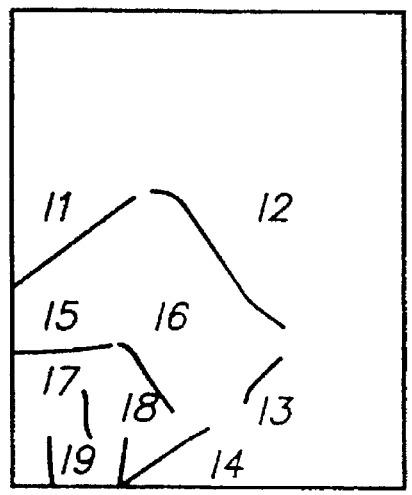
Figure 7C:
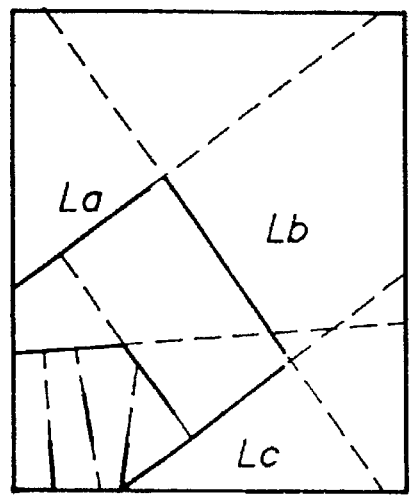

Steps i) and ii) Line detection and clustering

These steps have already been described in detail (also as steps i and ii) in European patent application EP-A-610 605.

The steps are unchanged from the system described in EP-A-610 605. They form the low-level image processing and analysis applied to the whole image.

In this system, however, the results are then applied to the problem of detection and localisation of the multiple-exposure boundary (steps iii, iv and v), whereas in the earlier system they were applied to the detection and localisation of the signal/shadow boundary (here: steps ix, x and xi).

Steps (i) and (ii) are as follows:

Step i) Extraction of low-level primitives

The preferred low-level primitives are lines. They are derived from the X-ray image in two stages: edge-detection and segmentation.

1.1 Edge Detection

The purpose of this stage is to produce an edge-image. The system according to the present invention incorporates a Canny edge-detection process.

The following are definitions of some terms used in connection with a Canny edge detection process:

Canny edge-detection: A particular process for edge-detection comprising optional smoothing, followed by production of an edge-image wherein a pixel is labelled as an edge-pixel if and only if the Sobel squared magnitude at that point is a local maximum along the (one-dimensional) trajectory which is normal to the Sobel orientation.

A Canny edge-image $\{E(r)\}$ is formed by non-maximal suppression of the Sobel squared magnitude in the direction of the orientation of the image gradient, i.e. normal to the Sobel orientation:

$$
\begin{aligned}
E(r) &= 1 \text{ if } G(r) > G(r+R_q) \geq G(r-R_q) \\
     &= 0 \text{ otherwise} \\
\text{where } R_q &= (1,0) \text{ if } ||Q(r)|-\pi/2| \leq \pi/8 \\
     &= (1,-1) \text{ if } ||Q(r)+\pi/4|-\pi/2| < \pi/8 \\
     &= (1,1) \text{ if } |Q(r)+\pi/4| < \pi/8 \\
     &= (0,1) \text{ if } |Q(r)| \leq \pi/8
\end{aligned}
$$

Let the vectors $r$, $r_q$ represent the two-dimensional coordinates on the image plane ($r=(i,j)$ say).

Smoothed image: An intrinsic image derived from the X-ray image wherein the high spatial frequencies are suppressed relative to the low spatial frequencies. E.g. the result of convolution of the X-ray image with a (two-dimensional) Gaussian.

Sobel squared magnitude: The pixel-value $G(i,j)$ representing the square of the gradient-magnitude of the image $\{X(i,j)\}$ as determined by the following formula:

$$G(i,j)=(X(i+1,j)-X(i-1,j))^2+(X(i,j+1)-X(i,j-1))^2$$

Sobel orientation: The pixel-value $Q(i,j)$ representing the orientation of the tangent to the iso-gradient-magnitude of the image $\{X(i,j)\}$, as determined by the following formula:

$$Q(i,j)=\operatorname{atan2}(X(i+1,j)-X(i-1,j),\ X(i,j+1)-X(i,j-1))$$

where atan2(y,x) is the arctangent C language function defined in $[-\pi,\pi]$.

The edge-detection process incorporated in our system comprises four stages:

1.1.1 Subsampling of the X-ray image

The subsampling reduces the number of pixels of an image. For example: an original image obtained by reading an irradiation image stored in a photostimulable phosphor screen comprising approximately 5 million pixels, is reduced to an image of about 20000 12-bit pixels, preserving the aspect ratio of the original image.

1.1.2 Canny Edge—Detection

The subsampled image is passed to a Canny edge-detector to produce images: Sobel-squared magnitude $\{G(i,j)\}$, Sobel-orientation $\{Q(i,j)\}$, and edge-image $\{E(i,j)\}$. The Gaussian smoothing is via a symmetric 5×5 convolution mask with weights calculated to effect a standard deviation of 0.35 pixels.

1.1.3 Elimination of Weak Edges

Edge-points with a low gradient magnitude indicate a weak edge. Studies have shown that the signal/shadow boundary is generally of high contrast, giving a large gradient magnitude. Very weak edges are therefore unlikely to form part of the signal/shadow boundary. Those with a Sobel-squared-magnitude below a threshold of 2000 are removed from {E(i,j)}, and correspondingly from {Q(i,j)}, and {G(i,j)}.

1.1.4 Angle of Locus

The orientation {O(i,j)}, of the locus of edge-points in the edge-image {E(i,j)}, is calculated in three stages: edge-thinning, connectivity analysis, linear regression.

1.1.4.1 Thinning

The edge-image is destructively thinned. The motivation is threefold:

1. The parameters of a regressed straight line, including the goodness-of-fit, are more accurately determined from the spatial distribution of edge-points.
2. The various types of junction (TERMINAL, T-JUNCTION . . . ) are more easily detected. This is required for corner-detection (below).
3. There then exists a close correspondence between the length of a straight line, and the number of (connected) edge-pixels of which it is made up. This is required for line-statistics (above).

Thinning is achieved by removing edge-pixels which do not affect the local (3×3) connectivity of other edge-pixels.

1.1.4.2 Connectivity Analysis

Connected edges are uniquely labelled by recursive edge-walking to create a label image {L(i,j)}. All edge-pixels mutually connected share a common, but otherwise unique, label.

1.1.4.3 Linear regression

In this connection the following definitions are first given:

—Linear regression: The process by which an edge can be optimally parameterised according to the spatial location of its constituent edge-pixels. E.g. the determination of the parameters of a line which are the radius to the normal (from the origin), and its orientation relative to the X-axis, by a least squares (of perpendicular distances) fit.

—Weighted linear regression: The process by which an edge can be optimally parameterised according to both the spatial location of its constituent edge-pixels, and the degree of certainty as to their correct classification (labelling). E.g. the determination of the parameters of a line which are the radius $R_{WLR}$ to the normal (from the origin), and its orientation $Q_{WLR}$ relative to the x-axis, by the minimisation of a weighted least squares (of perpendicular distances) fit, the weighting being the Sobel squared magnitude.

Let $P_k$ be the positions of the edge-pixels (indexed by k) which comprise the line:

$$P_k = (P_k^{(x)}, P_k^{(y)})$$

and let the positional covariance matrix be $\Gamma$:

$$\Gamma = \Gamma^{(x,x)}, \Gamma^{(x,y)} \Gamma^{(y,x)}, \Gamma^{(y,y)}$$

given by $\Gamma^{(a,b)} = \Sigma_k P_k^{(a)} P_k^{(b)} w_k - \Sigma_k P_k^{(a)} w_k \Sigma_k P_k^{(b)} w_k$ for a,b in {x,y} then $Q_{WLR} = \frac{1}{2} \text{atan2}(-2\Gamma^{(x,y)}, \Gamma^{(x,x)} - \Gamma^{(y,y)})$ and $R_{WLR} = (\sin(Q_{WLR}) \Sigma_k P_k^{(x)} w_k + \cos(Q_{WLR}) \Sigma_k P_k^{(y)} w_k) / \Sigma_k w_k$ The eigenvalues $\lambda_+ + \lambda_-$ of $\Gamma$ are the sum of square errors (i.e. proportional to the variances) in each of the principal directions ie along, and normal to, the best fit straight line:

$$2\lambda = Tr(\Gamma) \pm (Tr(\Gamma)^2 - 4Det(\Gamma))^{1/2}$$

In the described embodiment of the present invention the orientation of the locus at each point is calculated by linear regression of connected edge-points in a local neighbourhood (nominally 7×7). The connectivity is guaranteed by including only those pixels which, in {L(i,j)}, share a common label. The positional-covariance matrix gives the orientation of the maximum variance of the data which is also the orientation of the least-squares fit straight line with two degrees of freedom.

With reference to the definition of weighted linear regression, with $w_k=1$: $O(i,j) = Q_{WLR}$ is the orientation of the locus of edge-points without regard to the sense of the original edge. The ambiguity in the sense of the locus is resolved by borrowing from the Sobel orientation Q(r): the direction of the tangent to the Sobel squared magnitude iso-contour is always close to the direction of the tangent to the locus of edge-points as determined by the Canny edge-detector.

Therefore the orientation is adjusted to minimise the angular separation between O(i,j) and Q(i,j):

$$Min \{O(i,j) - Q(i,j) + k\pi\} \to k_{min} \ k \ \text{in} \ \{-3..3\}$$

$$O(i,j) := O(i,j) - Q(i,j) + k_{min}\pi + 2n\pi$$

where n is chosen so that the result is in $[0, 2\pi]$.

1.2 Segmentation

Line primitives are built from the remaining edges. The chains of edge-pixels are broken into piece-wise straight sections, and the pixels from each section assembled into a line structure. There are four steps to this procedure:

1.2.1 Vertex Analysis

An intrinsic image {V(i,j)} is constructed with labels for the classification of edge-pixels in {E(i,j)}. According to the 3×3 connectivity of edge-pixels in {E(i,j)}, one of the following labels are awarded to the corresponding point in {V(i,j)}: ISOLATED-POINT, TERMINAL, EDGE-POINT, T-JUNCTION, X-JUNCTION.

1.2.2 Corner Detection

Corners are detected by a refinement of the EDGE-POINT labels in {V(i,j)}. There are two stages:

1.2.2.1 Curve detection

An intrinsic image {U(i,j)} is calculated with values assigned to each pixel which corresponds to an EDGE-POINT labelling in {V(i,j)}. The pixel values in {U(i,j)} measure the local conformity of edge-pixels in {E(i,j)}, in a 7×7 neighbourhood, to a straight-line. The positional covariance matrix is calculated as described in 1.1.4.3 with all $w_k=1$.

The conformity, (to a straight line) is taken to be the ratio of major to minor eigenvalues of the positional covariance matrix, ie $\lambda_+/\lambda_-$. Pixels previously labelled as EDGE-POINTs in {V(i,j)} are then relabelled as CURVEs, if the conformity is less than a threshold value:

If V(i,j)=EDGE-POINT, and $\lambda_-/\lambda_+ > 0.04$, then V(i,j)= CURVE.

1.2.2.2 Non-maximal supression

The pixels in {U(i,j)} are identified as corners if they are both CURVE points in {V(i,j)} (i.e. having a value above some threshold), and they are locally maximum in a 3×3 neighbourhood. The corresponding pixels in {V(i,j)} are relabelled as CORNERS.

1.2.2 Extraction of connected edges

Those pixels in {V(i,j)} still retaining an EDGE-POINT classification are candidates for incorporation into the low-level primitives. Such pixels are extracted from {V(i,j)}, into {S(i,j)} say, which is the linear segmentation as an intrinsic image: each connected chain of pixels is given a unique label in {S(i,j)}. Each connected set of pixels is then gathered into a line structure which is the low-level primitive.

1.2.2.1 Rejection of short lines

Studies have shown that sides of the signal/shadow boundary generally have at least some portion of their length for which the edge-detector furnishes an unbroken chain of edge-pixels. In order to avoid false positives therefore, an implicit rule is that a side cannot be composed entirely of very short edge-chains, but must have at least one line (in the line-group) which is of substantial length. Prior to segmentation and extraction of the line primitives therefore, chains of edge-pixels shorter than some threshold length are rejected (from $\{S(i,j)\}$) at this point. By this means, the number of low-level primitives is reduced without compromising the accuracy: short lines may form part of the final hypothesis following data-retrieval.

1.2.3 Weighted linear regression

A weighted linear regression is performed on each of the lines, by which means the optimal parameters (normal radius to origin, and orientation), and conformity are recorded. The weights are the Sobel-squared magnitudes of the contributing edge-pixels, as a fraction of the maximum Sobel-squared magnitude:

$$w_k(i,j)=G(i,j)/\text{Max}\{G(u,v)\} \; \forall \, i,j \; \forall \, u,v$$

1.2.3.1 Rejection of poor lines

Lines are no longer 'local' entities. The test on conformity to a straight line is now repeated with a less tolerant threshold in accordance with the extra precision afforded by the (arbitrarily large) number of edge-pixels in the line:

1.2.4 Linear extrapolation

The surviving lines are extrapolated from each end, until they intersect either the edge of the image, or an edge-point which does not belong to that line (as determined from the labels in $\{S(i,j)\}$). The 'limits' so determined, are saved in the line structure. A distinction is made between each of the two limits which correspond to the two ends of the line. This distinction respects the sense of the line.

1.2.5 Data-retrieval

Edge-points are now recovered from $\{E(i,j)\}$ which were not classified as EDGE-POINTs in $\{V(i,j)\}$ (perhaps because they were reclassified as CORNERs, CURVEs or JUNCTIONs etc). For each line, two rectangular areas are scanned in $\{E(i,j)\}$ each of which is centred on (aligned with) the projection of the line as given by the regressed parameters $R_{WLR}$ and $Q_{WLR}$. The rectangles extend from the line end-points, to the limits as determined by extrapolation. The width of the rectangle is 5 pixels. All edge-points in $\{E(i,j)\}$ which were not already attributed to the line are now included.

Step ii) Extraction of intermediate-level primitives

2.1 Linear agglomerative clustering

In this connection the following definition are given:

"Linear agglomerative clustering" generally is an iterative process for grouping together lines which are deemed (by some criteria) to be sufficiently similar. E.g. a pair-wise agglomerative clustering process based on an analysis of variance test, and broadly as described in "Unsupervised Estimation of Polynomial Approximations To Smooth Surfaces in Images or Range Data" by J. F. Silverman and D. B. Cooper, Proc. IEEE Cont. on Automation and Robotics, 1986, page 299–304, and defined hereinbelow, but with the mergable entities being lines rather than regions, and the constraint that two mergable regions be touching replaced by a constraint that two lines (or line-clusters) be linearly coherent.

"Analysis of variance" is a statistical method for comparing (the similarity of) two sample distributions under the assumption that the underlying distribution is Gaussian; but the variance is unknown. The method determines an F-statistic, which is the ratio of the two sample variances, correctly normalised to take account of the true degrees of freedom.

When the test is to determine the likelihood of two distributions having the same parent distribution, then the ratio is between the unexplained and the explained variances. When applied to pair-wise clustering, the unexplained variance is the extra that is incurred by the proposed merge:

$$<\sigma_u^2>=(\chi_m^2-\chi_a^2)/|v_m-v_a-v_b|$$

where a,b and m denote the separate, and merged entities respectively; $\chi$ and $v$ are the chi-squared variates and corresponding degrees of freedom. The explained variance is that prior to the proposed merge:

$$<\sigma_e^2>=(\chi_a^2+\chi_b^2)/(v_a+v_b)$$

and $$F(v_u,v_e)=<\sigma_u^2>/<\sigma_e^2>$$

is the F statistic, having degrees of freedom $$v_u=|v_m-v_a-v_b|$$

and $$v_e=v_a+v_b$$

The F statistic is used to index the cumulative distribution function $Q(F|v_a,v_b)$ which gives the probability of that value or greater occuring by chance. If the unexplained variance (as a fraction of the explained) is low, then F is small, and $Q(F|v_a,v_b)$ is large. In that case, the entities may be safely clustered.

In the described embodiment of the present invention lines undergo linear agglomerative clustering according to a test of their linear coherency. For all line or line-cluster pairs, if the pair passes the test of linear coherency, an F statistic based on an analysis of variance, is computed. The pair with the highest probability $Q(F|v_a,v_b)$ is merged. The parameters and limits of the merged line-cluster are recomputed using weighted linear regression. The whole cycle is repeated until no line-clusters pass the linear coherency test.

2.1.1 Linear Coherency

Definitions:

Linearly coherent: Two lines or line-clusters are said to be linearly coherent if they could potentially form part of the same side of the rectangular signal/shadow boundary. Linear agglomerative clustering: an iterative process for grouping together lines which are deemed (by some criteria) to be sufficiently similar. E.g. a pair-wise agglomerative clustering process based on an analysis of variance test, and broadly as described in (Silverman & Cooper), but with the mergable entities being lines rather than regions, and the constraint that two mergable regions be touching replaced by a constraint that two lines (or line-clusters) be linearly coherent.

In the described embodiment of the present invention the linear coherency test is applied to each line or line-cluster pair during linear agglomerative clustering. For two line or line-clusters to be viable candidates for clustering:

1. They must be approximately collinear.
2. Their extrapolations must overlap or touch.
2.1.1.1 Collinearity
Two line-clusters are determined as collinear if:
1. The line-clusters are approximately parallel:

$$\text{Min } \{Q^{(1)}{}_{WLR} - Q^{(2)}{}_{WLR} 2e\pi\} < 15° \; e \text{ in } \{-1,0,1\}$$

and
2. The distance of closest approach between the two line-clusters is less than some threshold: $d_c < 4$ pixels.
2.1.1.2 Overlapping lines
Two line-clusters are said to have overlapping extrapolations if either has a perpendicular projection onto the other.
2.1.2 Analysis Of Variance The F-statistic based upon the analysis of variance is applied to test the likelihood that two sample distributions come from the same parent distribution. With reference to the definition of analysis of variance, and weighted linear regression, the chi-squared variates are the sum of square errors of the best fit straight line:

$$\chi_j^2 = \lambda_-^{(j)}$$

where the line-cluster index j is any of a,b,m. The corresponding degrees of freedom are:

$$v_a = N_a - 2$$

$$v_b = N_b - 2$$

$$v_m = N_a + N_b - 2$$

where $N_a$ and $N_b$ are the numbers of edge-pixels in the lines (of labels a and b respectively).

Step iii) Construction and costing of hypotheses

Figure 10A:
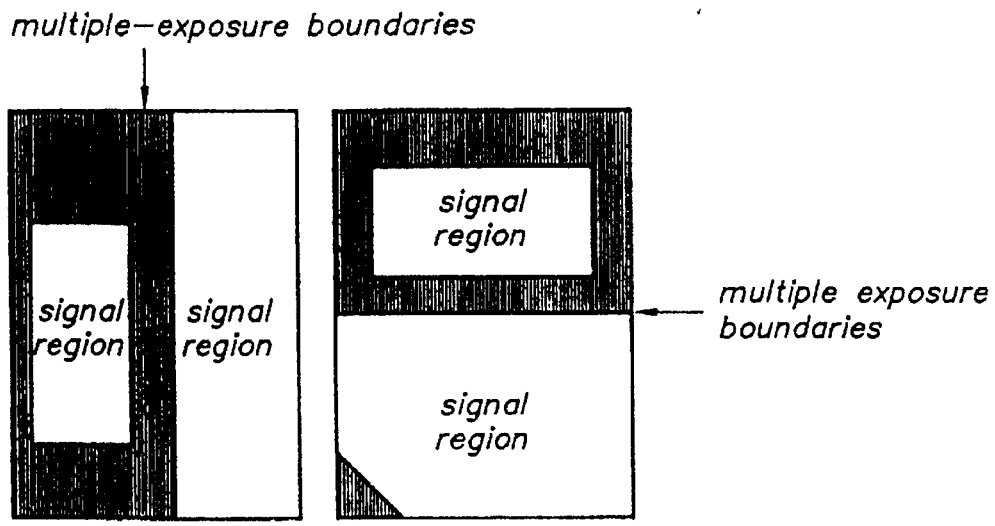
FIGS. 10a and 10b illustrate the derivation of multiple-exposure boundary configurations.
Figure 10B:
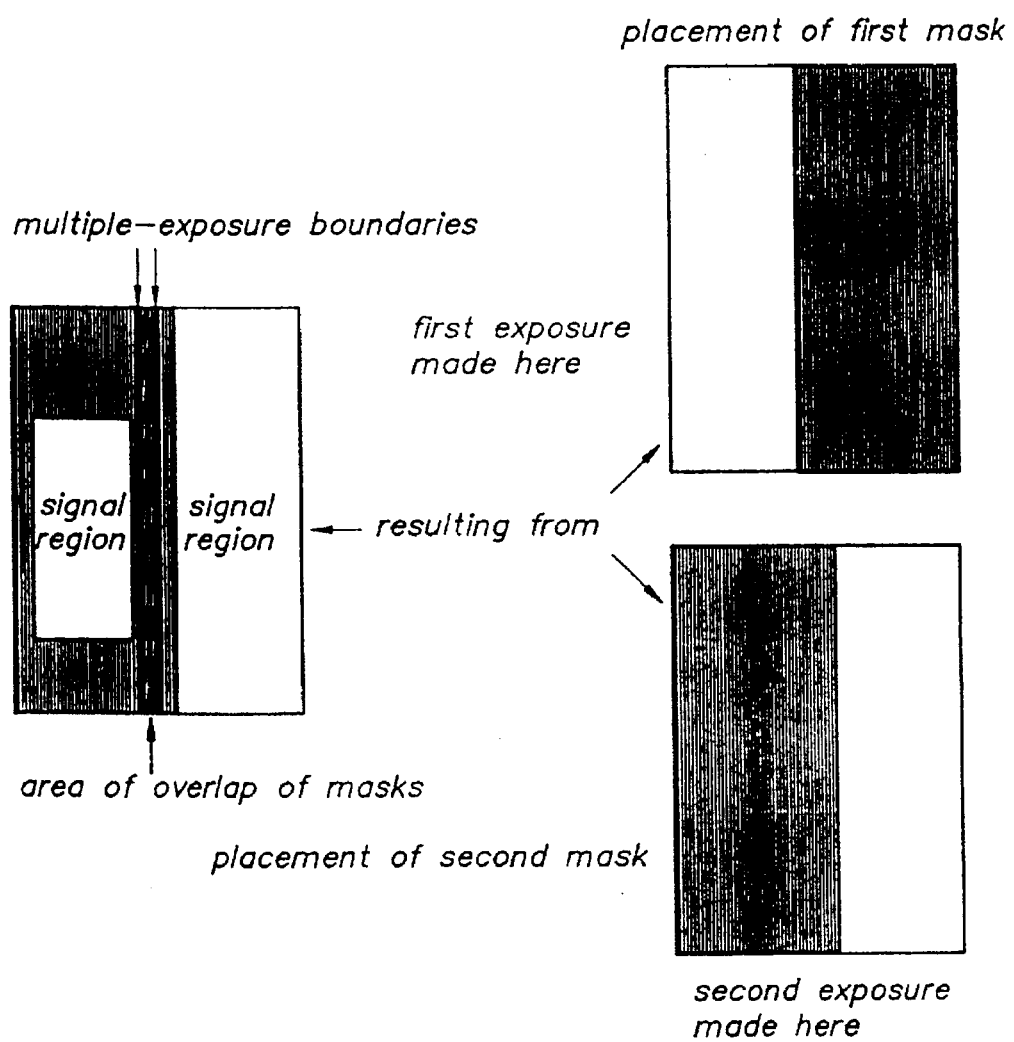

The role of the search tree is to find all hypotheses with up to two line-clusters which could possibly be evidence for a multiply-exposed image. The reason for allowing up to two line-clusters for a multiple-exposure boundary is that the placement of X-ray masking material to protect each sub-image may not be perfectly aligned. When the masks are perfectly aligned, the result is a single edge as implied in FIGS. 2a–2f. FIGS. 10a and 10b illustrates possible situations when the sub-image masks are not perfectly aligned. These correspond to hypotheses comprising two line-clusters and therefore at the third level of the search tree.

A search tree is constructed of all legal combinations of line-clusters. The tree starts with a root node (no line-cluster) which corresponds to the null hypothesis that the image is a single-exposure, rather than multiple-exposure.

The search tree has at most three levels, corresponding to the null hypothesis, and one level for each of the two line-clusters which can make up a multiple-exposure boundary. Each node of the search tree represents a hypothesis in its own right. The connection between the line-clusters, the hypotheses, and the nodes in the search tree are illustrated in FIGS. 11a–11c.

Figure 11A:
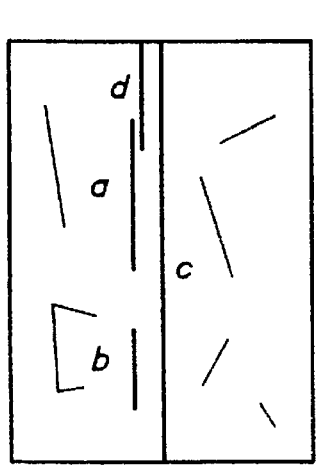
FIGS. 11a–11c illustrate the relation between line-clusters, multiple-exposure boundary search tree, and hypotheses.
Figure 11B:
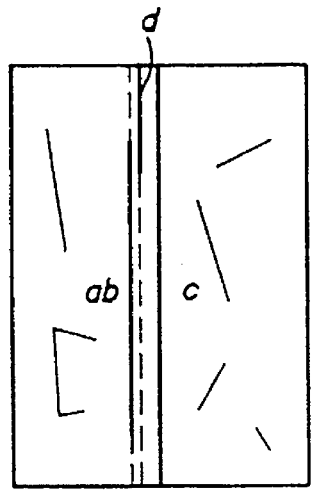
Figure 11C:
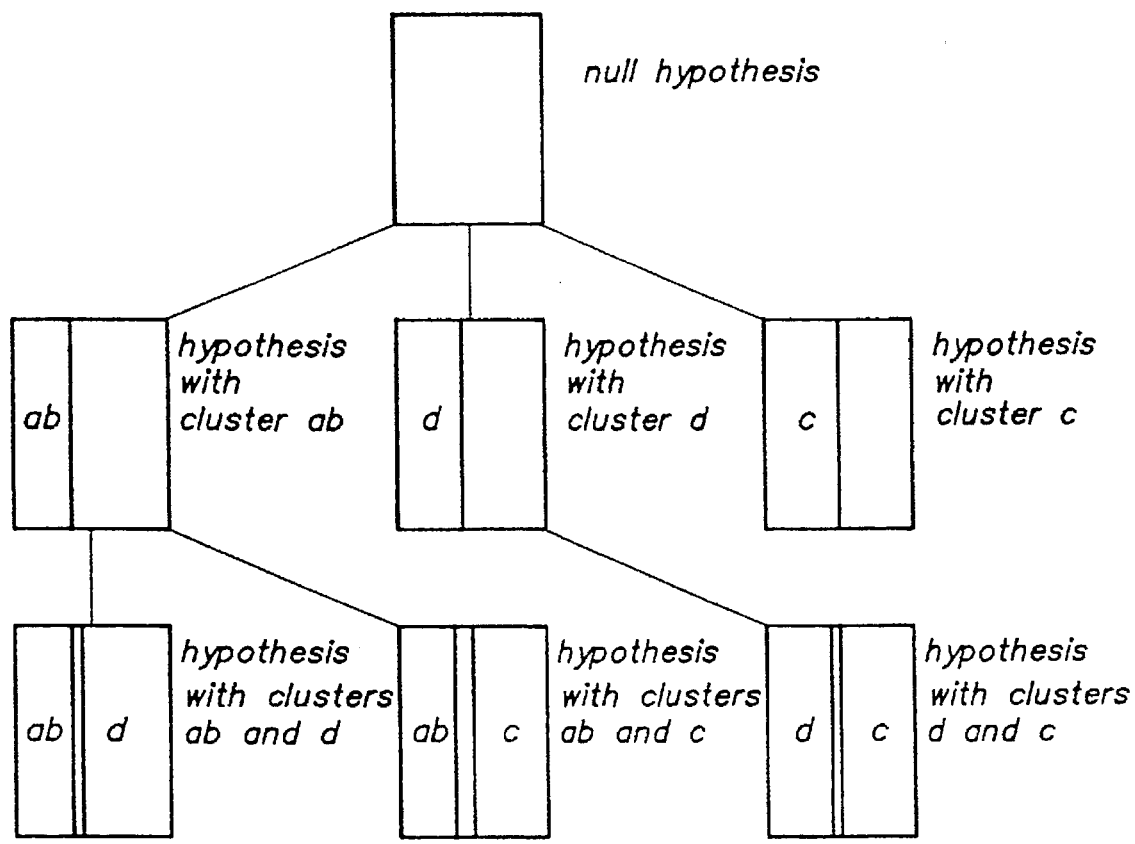

With reference to FIGS. 11a–11c, only the lines (a, b, c and d) are labelled which take part in hypothesis construction. In practice, an exhaustive search is made of all line-clusters, and line-cluster pair combinations, to test their possible inclusion in a hypothesis. However, the search relies on a set of rules regarding placement of the line-clusters to select only those which could possible form part of a hypothesis. This includes, for example, rules to select only those clusters which are approximately central to the image, running approximately horizontally or vertically.

Hypotheses are costed at the stage of construction. If there are n lines-clusters in the hypothesis, and if, for each cluster (index k), the fraction of its length for which there is edge data is $f_k$, then the cost is:

cost=$-n-\text{Max}(1-f_k)$ wherein $0 \leq k \leq n$, $0 \leq n \leq 2$, $0 \leq f_k \leq 1$
over k For example: a null hypothesis has a default cost of 0; a hypothesis with one line-cluster with fraction 0.3 of its length supported by edge data has cost −1.7. Clearly, hypotheses are favoured which contain more line-clusters, and for which there is more supporting edge data.

Step iv) Evaluation of hypotheses

Figure 8:
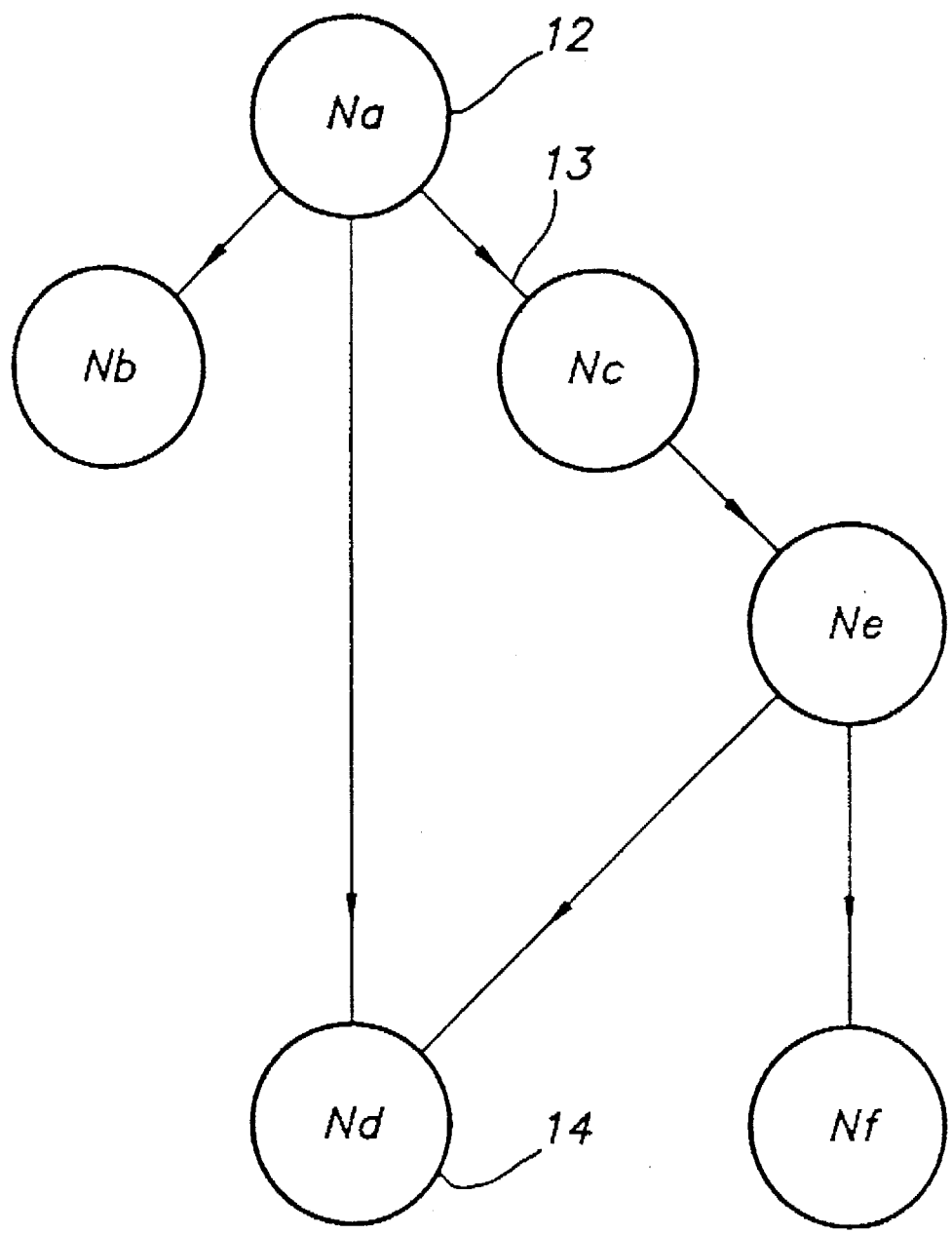
FIG. 8 is an example of a reasoning network, FIG. 9 are instances of signal/shadow boundary archetypes.
Figure 9:
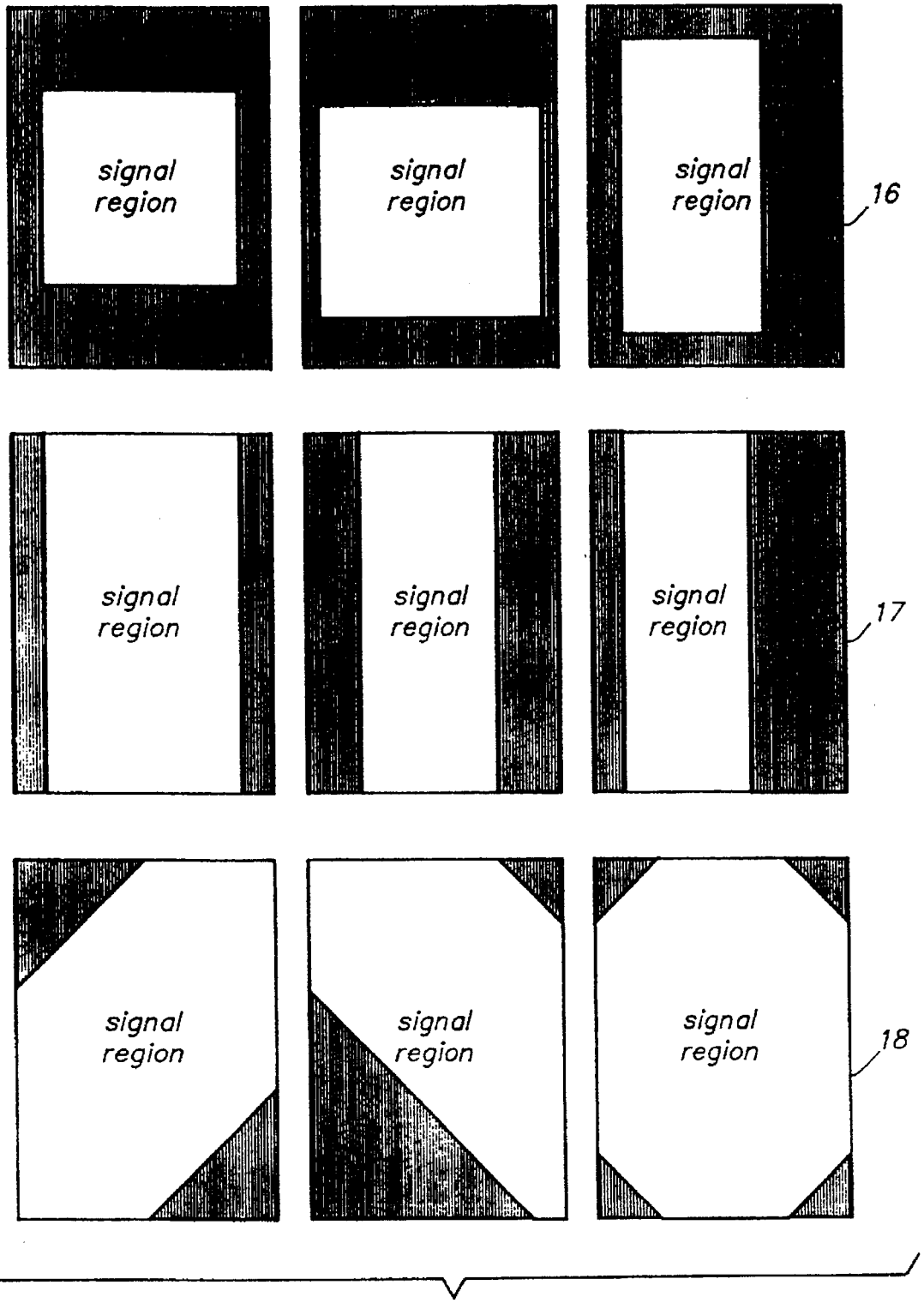

Each hypothesis is propagated through the reasoning network. Each node of the network contains a rule which must return a true value in order that the hypothesis propagate onto the descendants of that node. Thus a rule value at a descendent node forms a logical AND with its antecedent. Rule values at nodes sharing a common antecedent form a logical OR. An example is given in FIG. 8. Thus each hypothesis is subject to a complex logical expression which must be true in order that the hypothesis is verified.

The rule includes tests on the line-clusters and resulting sub-images comprising the hypothesis under evaluation. These tests place constraints (upper and lower limits) on the following quantities:

Geometry:
  Parallelism of line-cluster pairs (where there is more than one)
  Angle of line-cluster(s)
  Centrality of line-clusters in the image
  Aspect ratio of resulting sub-images
Line-cluster statistics
  Straightness
  Completeness (from one side of the image to the other)
  Contrast (normal to the cluster)
Sub-image statistics
  Mean grey-level of mask overlap region (where applicable—see FIG. 10b)
  Mean grey-level of incomplete masking region (where applicable).

Step v) Result selection

All hypotheses which reach the terminal nodes of the reasoning network are deemed verified. Once all hypotheses generated at step (iii) have been tested, that hypothesis with the least cost which has been verified at step (iv) is selected as the result. The default hypothesis is that the image is a single exposure only. This hypothesis is always verified as true, but has the highest possible cost (=0), and therefore is neglected in favour of any other feasible hypothesis.

Step vi) Sub-image partitioning

If the image is multiply-exposed, then the image is split into two sub-images consistent with the locus of the line-cluster(s) comprising the accepted hypothesis:

If there is just one line-cluster, then this is used as a guide for the cut: if the line-cluster is exactly parallel to an image edge, then the cut follows its trajectory. If it is not exactly parallel to an image edge, then the line-cluster is bisected so as to ensure two perfectly rectangular sub-images.

If there are two line-clusters, then a rectangular cut is made which otherwise is as central as possible in the masking overlap or incomplete masking bands.

The result of this step is to create one (null hypothesis) or two rectangular sub-images which are individually passed on to the collimation detection process (steps vii to xi). In the case of the null hypothesis, it is to be understood (in the following) that the (single) sub-image is identically equal to the whole image.

Steps vii) and viii) Line detection and clustering

These steps have already been described in detail (as steps i and ii) in EP-A-610 605. The steps are identical to the steps (i), and (ii) described above. They form the low-level image processing and analysis applied to the sub-image.

Step ix) Construction and costing of hypotheses

The role of the search tree is to find all hypotheses with upto four line-clusters which could possibly be evidence for a signal/shadow boundary.

A search tree is constructed of all legal combinations of line-clusters. The tree starts with a root node (no line-cluster) which corresponds to the null hypothesis that there is no signal/shadow boundary, and therefore no collimation, in the current sub-image.

The search tree has at most five levels, corresponding to the null hypothesis, and one level for each of the four line-clusters which can make up a signal/shadow boundary. Each node of the search tree represents a hypothesis in its own right. The connection between the line-clusters, the hypotheses, and the nodes in the search tree are illustrated in FIGS. 12a–12c.

Figure 12A:
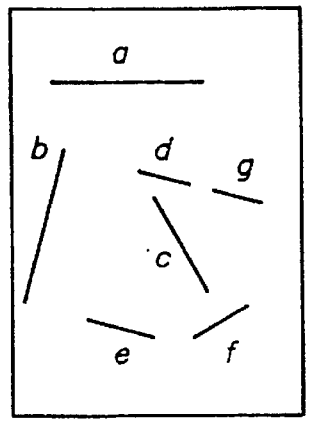
FIGS. 12a–12c illustrate the relation between line-clusters, signal/shadow boundary search tree, and hypotheses.
Figure 12B:
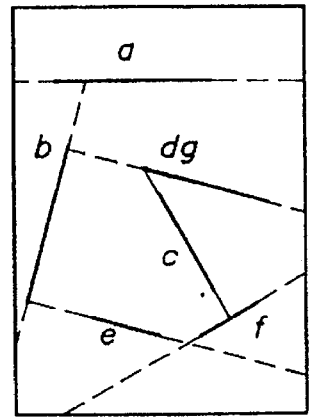
Figure 12C:
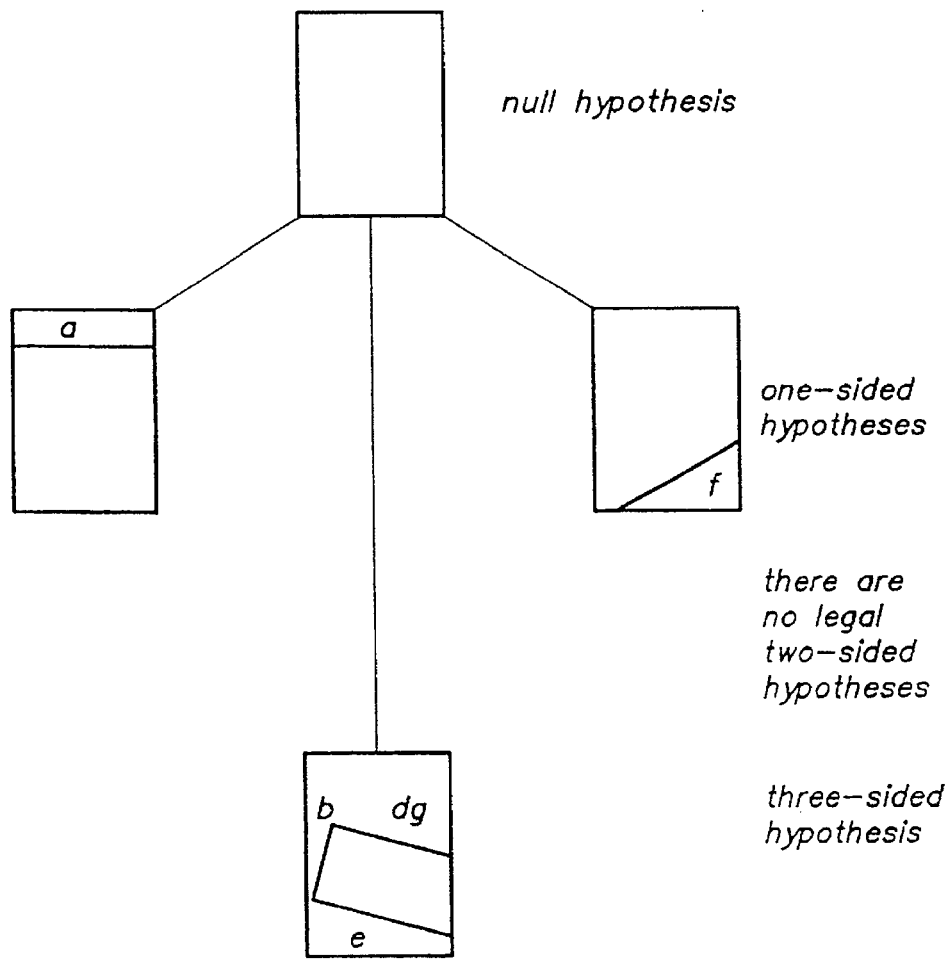

With reference to FIGS. 12a–12c an exhaustive search is made of all line-clusters, and line-cluster combinations (upto four deep), to test their possible inclusion in a hypothesis. However, the search relies on a set of rules regarding the geometry of the line-cluster combination to select only those combinations with could possibly form part of a hypothesis. This includes, for example a) Rules to select only those clusters which are mutually orthogonal (sides of a rectangle).

b) Rules to select combinations which form a closed boundary either between themselves, or including the edge of the sub-image.

It is through the enforcement of the closure rules that, for instance, none of clusters b, c, d, g, or e may form a one-sided hypothesis.

Hypotheses are costed at the stage of construction. If there are n line-clusters in the hypothesis, and if, for each cluster (index k), the fraction of its length for which there is edge-data is $f_k$, then the cost is:

cost=$-n-\text{Max}(1-f_k)$ wherein $0 \leq k \leq n$, $0 \leq n \leq 4$, $0 \leq f_k \leq 1$ over k For example: a null hypothesis has a default cost of 0; a hypothesis with one line-cluster with fraction 0.3 of its length supported by edge data has cost −1.7. Clearly, hypotheses are favoured which contain more line-clusters, and for which there is more supporting edge data.

Step x) Evaluation of hypotheses

Each hypothesis is propagated through the reasoning network. Each node of the network contains a rule which must return a true value in order that the hypothesis propagate onto the descendants of that node. Thus a rule value at a descendent node forms a logical AND with its antecedent. Rule values at nodes sharing a common antecedent form a logical OR. An example is given in FIG. 8. Thus each hypothesis is subject to a complex logical expression which must be true in order that the hypothesis is verified.

The rule includes tests on the line-clusters and resulting sub-images comprising the hypothesis under evaluation. These tests place constraints (upper and lower limits) on the following quantities:

Geometry:

Orthogonality of line-clusters (when there is more than one)

Orientation of the line-cluster(s)

Centrality of resulting signal region in the sub-image

Aspect ratio of resulting signal region

Line-cluster statistics

Straightness

Completeness (from one side of the image to the other)

Contrast (normal to the cluster)

Region statistics

Mean grey-level of signal and shadow regions

Variance of signal and shadow regions

Edge-point density of signal and shadow regions

Mean grey-level of half planes on shadow side of each cluster

Edge-point density in half planes on shadow side of each cluster.

Step xi) Result selection

All hypotheses which reach the terminal nodes of the reasoning network are deemed verified. Once all hypotheses generated at step (ix) have been tested, that hypothesis with the least cost which has been verified at step (x) is selected as the result. The default hypothesis is that there is no collimation, and that the current sub-image is therefore completely exposed. This hypothesis is always verified as true, but has the highest possible cost (=0), and therefore is neglected in favour of any other feasible hypothesis.

Step xii) Binary mask image

The binary mask is an image constructed by setting to some integer value all pixels in a signal region, as determined by successive iterations of steps vii) to xi). The same integer is assigned to all pixels in a signal region; a different integer for each signal region. The remaining (zero-valued) pixels are deemed to be either in the shadow region(s), in a multiple-exposure mask overlap region (FIG. 10b), or in a multiple exposure region of incomplete masking (not illustrated). This mask is then presented to the histogram equalisation and image display stages to act as a mask for further processing and display functions (to be executed upon the original X-ray image).

Network Property a) Archetype Classification

Figure 13:
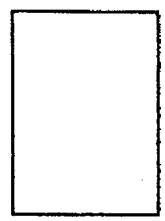
FIG. 13 shows a complete set of archetypes of the multiple-exposure reasoning network.
Figure 13:
Figure 13:
Figure 13:
Figure 13:
Figure 13:
Figure 13:
Figure 13:
Figure 13:
Figure 14:
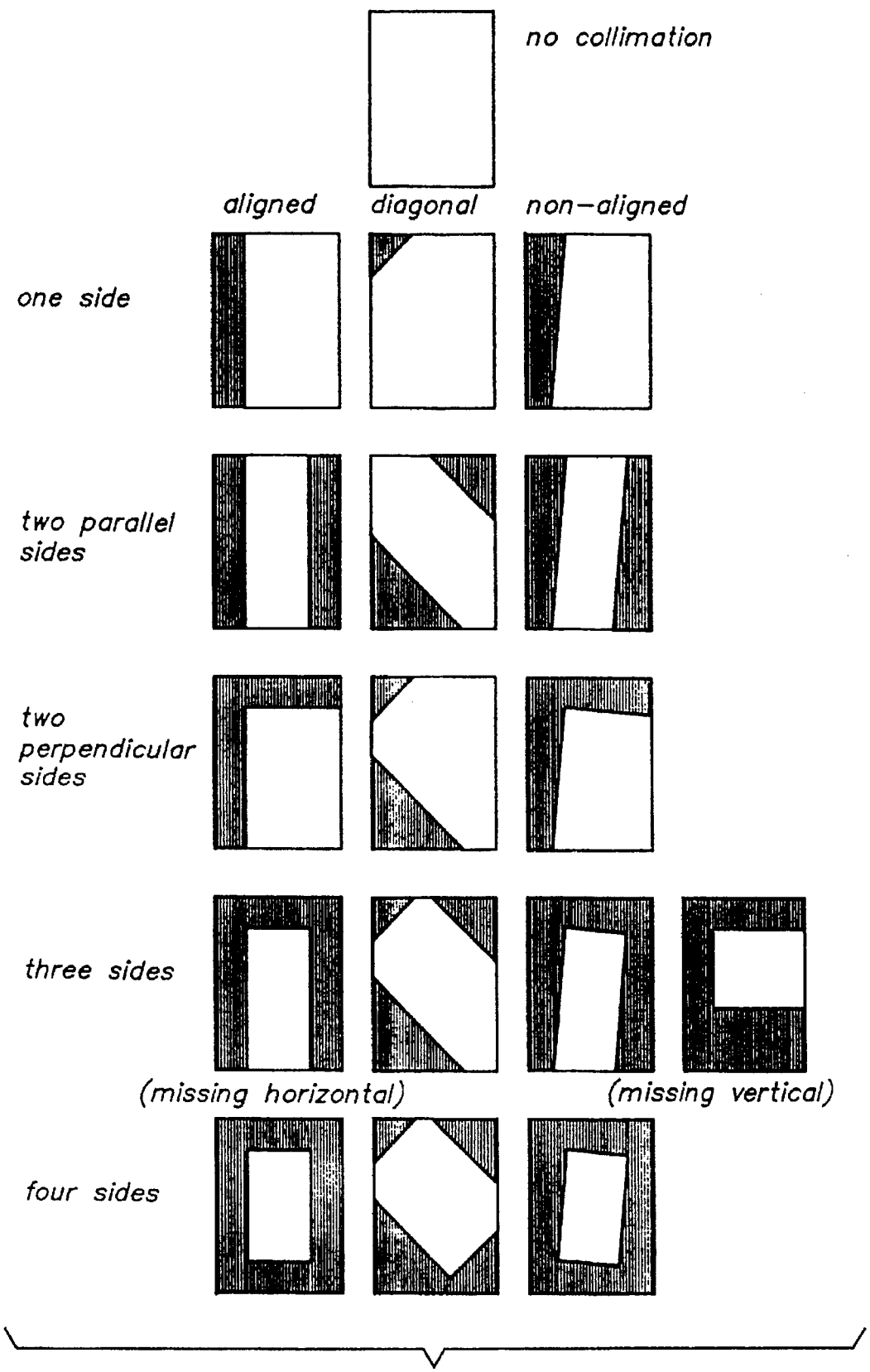
FIG. 14 shows a complete set of archetypes of the collimation (signal/shadow) reasoning network.

The multiple-exposure and signal/shadow reasoning networks each embody an archetype classification and refinement philosophy. By archetype classification we mean that the higher (earlier) branches of the network are designed to channel (propagate) the current hypothesis according to its classification as one of a set of well defined topological and geometrical configurations. In the case of the multiple-exposure network, these archetypes are illustrated in FIG. 13. For the case of the signal/shadow reasoning network, these archetypes are illustrated in FIG. 14.

The rules at the nodes in the higher branches still belong to the sets described in steps iv and x respectively. However, the role of these rules is to act as a filter with the aim of having the current hypothesis proceed to the deeper, lower nodes in just one of the major branches. In that sense, the current hypothesis is deemed to be classified according to an archetype.

Network Property b) Refinement

Once a hypothesis has been classified, further rules must be satisfied before it is deemed verified. These refinement rules seek to exclude all those hypotheses which, for the given topological and geometrical classification, broadly speaking, do not have the requisite line-cluster or region statistics. These statistical constraints are those which have been found empirically, from a network training phase, to be associated with true hypotheses. Further geometrical rules may also be applied during refinement where appropriate.

Network Property c) Training

The thresholds for the rules at all stages in the network are obtained from interactive supervision of the passage of good and bad (true and false) hypotheses through the network. Changes are made to the rule thresholds consistent with the intended function of rules to classify or refine/reject hypotheses. The aim of this training is to arrive at a network for which all true hypotheses, and more of the false hypotheses, survive the refinement stages. The network contains a memory of previously supervised hypotheses, so that adjustments during supervision are consistent with previous training passes, and the network converges towards a stable behaviour.

I claim:

1. A method of determining a multi-exposure boundary between sub-images in a multi-exposure X-ray image represented by a digital signal representation and of determining a signal/shadow boundary in each sub-image, comprising the steps of i) Extracting low-level line primitives from the X-ray image, ii) Forming intermediate-level primitives from the low-level primitives, iii) Building hypotheses as to the location of the multiple-exposure boundary from combinations of intermediate-level primitives, iv) Associating with each of said hypotheses a cost, v) Subjecting each of said hypotheses to evaluation tests via a rule-based partitioning reasoning network, vi) Associating a cost with each of said hypotheses, vii) Selecting a hypothesis with the least associated cost, viii) Partitioning the image into sub-images defined by selected hypothesis, and ix) Submitting each of said sub-images for subsequent detection of a signal/shadow boundary to the following steps (ix) to (xvii):

x) Extracting low-level primitives from each sub-image, xi) Forming intermediate-level primitives from the low-level primitives extracted from a sub-image, xii) Building hypotheses as to the location of the signal/shadow boundary from combinations of intermediate-level primitives, xiii) associating a cost with each of said hypotheses, xiv) Subjecting each of said hypotheses to evaluation tests via a rule-based collimation reasoning network, xv) Associating a cost with each of said hypotheses, xvi) Selecting a hypothesis with the least cost, xvii) Constructing a binary-valued mask image representing signal and shadow area, said binary-valued mask image being used to extract the signal area in the X-ray image.

2. A method according to claim 1, wherein said low level primitives are lines, said intermediate level primitives are line-groups and wherein said hypotheses for the multiple-exposure boundary are formed from every possible line-cluster and pair of line-clusters, including, a hypothesis that there is no multiple-exposure boundary.

3. A method according to claim 1, wherein the evaluation tests applied to a hypothesis as to the location of the multiple-exposure boundary, comprise any logical combinations of the following tests :

—test for boundary closure, which test is passed when line-clusters in a hypothesis under consideration, when having been extrapolated, each terminate on the edge of the image, —test for boundary location, which test is passed when said line-clusters pass close to the centre of the image, —test for boundary alignment, which test is passed when said line-clusters are nearly parallel to a side of the image, —test for boundary completion, which test is passed when the fraction of the boundary perimeter length, for which there exists evidence from the low-level primitives, is greater than a given threshold value.

4. A method according to claim 2 wherein said cost that is assigned to each multiple-exposure hypothesis is lowest if a hypothesis comprises two approximately parallel line-clusters, and wherein said cost increases as the number of visible line-clusters in a hypothesis decreases, and said cost is highest if a hypothesis has no line-clusters.

5. A method according to claim 1 wherein image processing performed on said digital signal representation of said X-ray image is limited to pixel values of said image within a signal/shadow boundary.

6. A method according to claim 1 wherein a digital signal representation of an X-ray image is obtained by scanning an exposed photostimulable phosphor screen with stimulating irradiation, detecting light emitted upon stimulation and converting the detected light into a digital signal representation.

* * * * *

UNITED STATES PATENT AND TRADEMARK OFFICE
CERTIFICATE OF CORRECTION

PATENT NO. : 5,651,042
DATED : July 22, 1997
INVENTOR(S) : Piet Dewaele

It is certified that error appears in the above-identified patent and that said Letters Patent is hereby corrected as shown below:

Title page, Item 54, 2nd line and Column 1, line 2, the title should read --IRRADIATION FIELDS--;

Column 2, line 22, "0 42 379" should read --0 342 379--;

Column 12, line 13, that portion of the merge reading "$x_a^2$" should read -- $x_a^2 \cdot x_b^2$ -- .

Signed and Sealed this

Seventeenth Day of March, 1998

Attest:

BRUCE LEHMAN

Attesting Officer

Commissioner of Patents and Trademarks